US006565350B2

United States Patent
Siferd et al.

(10) Patent No.: US 6,565,350 B2
(45) Date of Patent: May 20, 2003

(54) APPARATUS FOR FORMING A REINFORCING STRUCTURE ON AN END OF A PIPE

(75) Inventors: Roger Lee Siferd, Findlay, OH (US); Matthew C. Ankrom, Findlay, OH (US); Larry E. Porter, Findlay, OH (US)

(73) Assignee: Hancor, Inc., Findlay, OH (US)

( * ) Notice: Subject to any disclaimer, the term of this patent is extended or adjusted under 35 U.S.C. 154(b) by 0 days.

(21) Appl. No.: 09/766,341

(22) Filed: Jan. 19, 2001

(65) Prior Publication Data

US 2001/0013372 A1 Aug. 16, 2001

Related U.S. Application Data

(62) Division of application No. 09/245,766, filed on Feb. 5, 1999, now Pat. No. 6,199,592.

(51) Int. Cl.[7] .............................................. B29C 53/34
(52) U.S. Cl. ...................... 425/393; 425/392; 425/398; 425/DIG. 218
(58) Field of Search ................................. 425/393, 392, 425/DIG. 218, 398

(56) References Cited

U.S. PATENT DOCUMENTS 3,065,677 A * 11/1962 Loeser ........................ 425/393
3,520,047 A    7/1970 Muhlner et al. ............ 264/249
3,632,732 A    1/1972 Osterhagen et al. ........ 264/312
3,749,543 A    7/1973 Stansbury ................... 425/393
3,806,301 A    4/1974 Osterhagen et al. ........ 425/393
3,823,216 A    7/1974 Petzetakis .................. 264/296
3,914,102 A * 10/1975 Brown ........................ 425/392
3,998,578 A   12/1976 Acda .......................... 425/393
4,005,968 A    2/1977 Crawford .................... 425/384
4,008,028 A *  2/1977 Ronden et al. ............. 425/393

(List continued on next page.)

OTHER PUBLICATIONS

Corma Inc., "Vacuum Method versus Blow Molding Method", Aug. 1992.
Corma Inc., "Fabricators of the Best–Selling Corrugator Equipment in the World", Jun. 1997.

*Primary Examiner*—Robert Davis
*Assistant Examiner*—Thu Khanh Nguyen
(74) *Attorney, Agent, or Firm*—Jones Day (57) ABSTRACT

A pipe section formed of a polymeric material which has a substantially constant thickness throughout, the terminal edge of the female connection having a reinforcement structure which rigidifies the end of the female connection and prevents deformation, the pipe section preferably having a flared end, and the reinforcement structure preferably being a semicircular channel formed at the end of the pipe section by a mandrel after initial extrusion of the pipe section; along with a method and apparatus for forming the pipe section, a pipe assembly including such pipe section, and a method of forming the pipe assembly.

19 Claims, 8 Drawing Sheets

U.S. PATENT DOCUMENTS

| | | | | |
|---|---|---|---|---|
| 4,030,872 A | | 6/1977 | Parmann | 425/393 |
| RE29,446 E | | 10/1977 | Sonnleitner et al. | 425/297 |
| 4,107,249 A | | 8/1978 | Mural et al. | 264/68 |
| 4,134,949 A | | 1/1979 | McGregor | 264/519 |
| 4,150,087 A | | 4/1979 | de Putter et al. | 264/296 |
| 4,156,710 A | * | 5/1979 | Carroll et al. | 264/322 |
| 4,157,372 A | | 6/1979 | Kyomen | 264/296 |
| 4,161,384 A | | 7/1979 | McGregor | 425/388 |
| 4,170,448 A | | 10/1979 | French | 425/393 |
| 4,177,237 A | | 12/1979 | Ueno et al. | 264/296 |
| 4,204,823 A | | 5/1980 | Hayes et al. | 264/322 |
| 4,218,208 A | | 8/1980 | Hayes et al. | 425/388 |
| 4,239,473 A | | 12/1980 | Fulhaber | 425/392 |
| 4,266,926 A | | 5/1981 | Gordon | 425/393 |
| 4,277,231 A | | 7/1981 | Gordon | 425/393 |
| 4,279,853 A | | 7/1981 | Ohta et al. | 264/230 |
| 4,299,412 A | | 11/1981 | Parmann | 285/110 |
| 4,315,630 A | | 2/1982 | French et al. | 277/625 |
| 4,324,755 A | * | 4/1982 | Bommer | 425/392 |
| 4,331,625 A | | 5/1982 | van de Zee et al. | 264/249 |
| 4,338,716 A | | 7/1982 | Marissen et al. | 264/238 |
| 4,353,860 A | | 10/1982 | Gordon | 264/296 |
| 4,362,187 A | | 12/1982 | Harris et al. | 138/109 |
| 4,379,115 A | | 4/1983 | Seach et al. | 425/393 |
| 4,395,379 A | | 7/1983 | Herder et al. | 264/296 |
| 4,428,591 A | | 1/1984 | Marissen et al. | 138/109 |
| 4,463,658 A | | 8/1984 | Helser et al. | 91/388 |
| 4,474,723 A | * | 10/1984 | Irmer | 425/393 |
| 4,474,726 A | | 10/1984 | Ohta et al. | 264/516 |
| 4,481,978 A | | 11/1984 | Escandell | 138/150 |
| 4,545,951 A | | 10/1985 | Gordon | 264/322 |
| 4,643,658 A | | 2/1987 | Gordon | 425/398 |
| 4,723,905 A | | 2/1988 | Vassallo et al. | 425/392 |
| 4,779,651 A | | 10/1988 | Hegler et al. | 138/109 |
| 4,826,028 A | | 5/1989 | Vassallo et al. | 277/619 |
| 4,834,430 A | | 5/1989 | Vassallo et al. | 285/379 |
| 4,865,362 A | | 9/1989 | Holden | 138/109 |
| 4,880,579 A | * | 11/1989 | Murata et al. | 425/DIG. 218 |
| 4,906,010 A | | 3/1990 | Pickering et al. | 277/625 |
| 4,915,425 A | | 4/1990 | Hegler et al. | 138/173 |
| 4,968,241 A | | 11/1990 | Darling | 425/509 |
| 5,064,207 A | | 11/1991 | Bengtsson | 277/616 |
| 5,158,389 A | | 10/1992 | Osterwald et al. | 138/121 |
| 5,296,188 A | | 3/1994 | Lupke | 264/508 |
| 5,348,051 A | | 9/1994 | Kallenbach | 138/121 |
| 5,678,610 A | | 10/1997 | Scarazzo et al. | 138/121 |
| 5,992,469 A | | 11/1999 | Hegler | 138/109 |
| 5,996,635 A | | 12/1999 | Hegler | 138/109 |

* cited by examiner

APPARATUS FOR FORMING A REINFORCING STRUCTURE ON AN END OF A PIPE

CROSS-REFERENCE TO RELATED APPLICATIONS

This application is a divisional of U.S. patent application Ser. No. 09/245,766, filed on Feb. 5, 1999, now U.S. Pat. No. 6,199,592.

FIELD OF THE INVENTION

This invention relates to pipes made from polymeric material, and more particularly to pipes made as segments which are assembled into larger pipe systems during installation.

BACKGROUND OF THE INVENTION

During recent years, it has become more and more common for pipes for the transmission of fluids to be made from plastic materials.

Non-metal materials are made into various types of pipes by several methods. For instance, it is known to extrude PVC into various shaped pipes. Another more economical method is the corrugated pipe technique, which uses blow mold and vacuum mold techniques to produce a pipe which is formed as extruded tubes of a polymer such as HDPE (high density polyethylene). Systems for fabricating such corrugated pipes are sold by Corma, Inc. of Concord, Ontario. A system of this type is also described in U.S. Pat. No. 5,296,188, which is herein incorporated by reference.

Polymer material pipes are generally manufactured as continuous extrusions which are then cut into sections. Frequently, each section has a male end and a female end, and these sections are linked sequentially across the distance needed for the pipe to extend. The female end of the pipe, sometimes called a bell, receives the male end, sometimes called a spigot, of the next pipe therein.

One problem presented in such pipes derives from the fact that, during fabrication, the material from which the pipe is made is heated, and then cooled. As different portions of the pipe cool and shrink at different rates, stresses are created. If the pipe is then exposed to heat, even such as that of strong sunlight, it may cause enough warming to soften portions of the pipe.

The result of this is that portions of the bell are altered from the desired shape. As a result, the bell, which is optimally an open flared cone or skirt with a circular mouth, "flowers", i.e., deforms into a roughly clover-leaf or flower cross-section. This flowered structure presents problems when the pipe sections are to be assembled, since the puckering of this shape may make the female end of the pipe too small to easily accommodate the male end of the next pipe section. This means that the construction crew must try to pry the flowered bell apart to insert the male portion. This is inefficient in terms of labor costs and time. Moreover, the flowering can render the pipe section completely unusable.

Similarly, stacking of the pipe section can create loads in the female end of the pipe section. If environmental factors such as heat created by sunlight or high ambient temperatures are present, this can soften the material to the degree that deformation occurs.

OBJECTS AND SUMMARY OF THE INVENTION

It is therefore an object of the invention to provide a pipe section having a female end with a strengthened periphery.

It is also an object of the invention to provide a pipe section with a female end resistant to deformation.

It is another object of the invention to provide a pipe section which is readily connected with another pipe section to form a pipe assembly.

It is still another object of the invention to provide a pipe assembly which is efficiently and cost-effectively fabricated in the field and is reliably sealed against leakage.

It is a further object of the invention to provide a method and apparatus for making the pipe section of the invention.

It is yet another object of the invention to provide a method of fabricating the pipe assembly of the invention.

Accordingly, in one aspect the invention is a pipe section which comprises a segment of polymeric material configured as a conduit having an end strengthened by a reinforcing structure formed integrally of said material around the periphery of said end.

In another aspect, the invention is a pipe assembly for accommodating fluid flow therethrough, which includes a first pipe section comprising a segment of polymeric material configured as a conduit and having a male end and a female end, said first pipe section's female end being flared and being strengthened by a reinforcing structure formed integrally of said material around the periphery of said female end, and a second pipe section comprising a segment of polymeric material configured as a conduit and having a male end and a female end, said male end of said second pipe section being in the female end of the first pipe section such that fluid may flow from one of said sections into the other.

In a further aspect, the invention is a method of forming a pipe section, which comprises subjecting an end of a segment of polymeric material configured as a conduit to conditions sufficient to render the material proximate such end plastic, and turning the plastic polymeric material at such end back away from the end to form an integral reinforcing structure.

In yet another aspect, the invention is method of fabricating a pipe assembly for accommodating fluid flow therethrough, said assembly including a first pipe section comprising a segment of polymeric material configured as a conduit and having a male end and a female end, said female end being flared and being strengthened by a reinforcing structure formed integrally of said material around the periphery of said female end, and a second pipe section comprising a segment of polymeric material configured as a conduit and having a male end and a female end, which method comprises bringing the female end of said first pipe section and the male end of said second pipe section into approximate registration by inserting the male end of the second pipe into the flared female end of the first pipe section, and connecting the male end of the second pipe section and the female end of the first pipe section when the two sections are in alignment, such that fluid may flow from one of said sections into the other.

In still another aspect, the invention is an apparatus for forming a reinforcing structure on an open end of a polymeric pipe section, which has a mandrel having a wall for contacting said pipe section. The mandrel includes a first portion wherein the wall is configured to be received in the open end of the pipe section, and another portion in which the wall extends outwardly of the first portion in arcuate fashion such that an annular pocket is formed. The apparatus has means for holding the pipe section in an orientation such that it and the mandrel can be brought into contact, with the mandrel's first portion being first received in the opening at the end of the pipe section. The apparatus also has means for causing movement of the mandrel and the pipe section holding means relative to one another such that the mandrel and the pipe section come together with the mandrel's first portion being received by the opening at the end of the pipe section, and thereafter the annular pocket of the third portion coming into contact with and deforming the end of the pipe section to form a reinforcing structure.

Of course, it will be understood that the invention pertains not only to straight-line pipe sections but also to all other configurations, such as elbow-shaped or T-shaped fittings.

Substantial benefits are conferred by practice of the invention. The provision of a reinforcing structure integral with the subject pipe section, proximate the periphery of the female end, effectively strengthens the structure so that it maintains its desired shape, resists deformation during storage before use, and can withstand rough handling during connection of other piping to it. The pipe assembly incorporating such pipe section is cost effectively fabricated in the field and has increased strength at the point of interface during the connection operation, with the result that such operation is made easier and more efficient. And, the method and apparatus for making the pipe section, as well as the method for making the aforementioned pipe assembly, of the invention are correspondingly convenient and cost effective.

Other objects and benefits of the invention will become apparent from the present specification, and the invention will be set forth in the claims.

DETAILED DESCRIPTION OF CERTAIN PREFERRED EMBODIMENTS OF THE INVENTION

A central feature of our invention is formation of the integral reinforcing member on the female end of a subject pipe section. This member reinforces the female end's peripheral edge so that it can withstand rough contact, jostling and the like when a male end of another pipe section is inserted and moved around to secure alignment pursuant to connection of the pipe sections. Typically, practice of the present invention results in attainment of a hoop strength at the reinforced female end of at least 10, and preferably at least 15, pounds (e.g. for 4-inch diameter conduit) and in some cases 50, and preferably at least 80, pounds (e.g., for 12-inch diameter conduit), hoop strength being defined as the amount of force needed to laterally compress a pipe by 5% of its diameter. Moreover, the reinforcing member strengthens the female end of a subject pipe section, especially when flared, against deformation resulting from flowering by providing a skeletal frame which holds the end in its desired shape. Also, the reinforcing member provides extra support while the pipe section is being stored, for example, stacked in contact with other pipe sections. In the event ambient conditions such as heat, sunlight or the like cause a softening of the pipe section's constituent material the reinforcing member contributes added structural integrity so that degradation which might otherwise occur can be prevented or at least decreased substantially.

While useful with a range of materials, the invention is especially applicable to piping made of polymeric materials such as polyethylene, polypropylene and PVC (in certain good embodiments, especially with polypropylene and PVC for instance, filler is also incorporated to reduce cost). Over and above such materials' intrinsic value in piping applications, they are particularly useful for producing piping in a variety of shapes and styles, especially piping having a corrugated wall, which structure confers a relatively greater strength to weight ratio vis-a-vis non-corrugated piping. This is a consequence of the fact that the solidified polymeric materials of which conduit is made characteristically are formed from precursors (such as the polymeric material at elevated temperature, e.g., hot polyethylene, or a reaction mixture subjected eventually to curing conditions) which have rheological properties permitting material flow until setting. Since such precursors are highly formable, the polymeric materials are particularly useful in extrusion processes, and other processes which similarly require a high degree of formability, for making the corrugated pipe sections on other shapes and styles contemplated in connection with the present invention.

It follows that a preferred embodiment of the invention is a method of forming a pipe section, which comprises subjecting an end of a length of polymeric material configured as a conduit with a corrugated wall to conditions sufficient to render the material proximate said end plastic; shaping the plastic polymeric material proximate said end into a flared portion; turning the plastic material at the end of said flared portion back away from the end to form an integral reinforcing structure.

The characteristics of the inventive pipe section as herein described lead to a highly advantageous pipe assembly comprising at least two pipe sections aligned and connected utilizing the invention. As brought out in more depth below, the present invention is very effective in maintaining the shape of a subject pipe section's female end so that a good fit between it and the male end of another pipe section can reliably be achieved, without the necessity for mechanical working of such female end in order to return it to its initial configuration conforming to and accommodating the shape of the male end. Moreover, when the female end of a subject pipe section is flared, the reinforcing member has the further effects of dimensionally stabilizing the flared end (again for the purpose of reliably accommodating the other pipe section's male end), and strengthening the edge of the flared portion so that movement therein of the other pipe section's end to achieve the desired alignment can be carried out with decreased danger of deformation of the flared portion through rough contact, etc.

It can, therefore, be seen that another preferred embodiment of the invention is that it involves a method of fabricating a pipe assembly as aforesaid. In this method the pipe section is formed from a polymeric material, and it has a first tubular conduit. A female connection on the end of the conduit has a generally cylindrical or conical structure which extends from the end of the conduit.

The terminal portion of the end structure is then heated to make the material plastic. The terminal portion of the female connection and a mandrel are then pressed together. The mandrel has a pocket structure which causes the heated end of the female connection to bend backwards to form a reinforcing rim structure. The heated end is then allowed to set. The cooled material of the rim structure reinforces the female connection so that the flowering and other deformation problems of the prior art are not encountered.

To provide an integrated treatment of various structural aspects of the invention, we consider a pipe assembly formed of at least first and second pipe sections. The first pipe section comprises a tubular conduit with a female connection on the end. The second pipe section has a tubular conduit with a male connection on its end. The female connection receives the male connection so that the interior of the first pipe section communicates with the interior of the second pipe section, and water or other fluid can flow through the pipe assembly.

The female connection is formed of a polymeric material. It has a first connection portion which is connected to the end of the conduit and extends longitudinally away from it. The female connection also has an annular terminal edge which defines an opening at the end of the pipe section. The terminal edge has a reinforcement structure which rigidifies the end of the female connection and prevents the flowering and other deformation problems of the prior art.

The reinforcement structure preferably includes a first annular portion formed integral with the first connection portion, a second annular portion formed integral with this portion and extending radially inwardly or outwardly of the first annular portion, and a third annular portion which is formed integral with the second annular portion and extends longitudinally inwardly of the first pipe section.

In a preferred embodiment, the first pipe section has a corrugated outer structure of the same polymeric material as the female connection affixed to the outer surface of the conduit. Preferably, the corrugated outer surface is formed integral with the female connection portion and is of material which is substantially the same thickness as in the female connection.

The female connection is also provided with a widening flared opening to aid assembly of the pipes in, for instance, a trench, where it is difficult to perfectly align the pipe sections for assembly. This is a valuable feature, since it is often fairly difficult to align the pipes precisely before pressing them together; provision of a flared portion which helps guide another pipe section's end toward the female connection site expedites attaining alignment. In such connection, it should be noted that as used herein: the term "approximate registration" refers to the condition in which two pipe sections are oriented vis-a-vis one another that the male end of one can be or is inserted into the flared female end of the other; and the term "alignment" refers to the condition of such section. The flare also enhances the structural strength of the end of the pipe section.

The rigidity of the female connection also may be enhanced by the use of several crimped or creased portions of the end portion which additionally reinforce the structure of the female connection.

Figure 1:
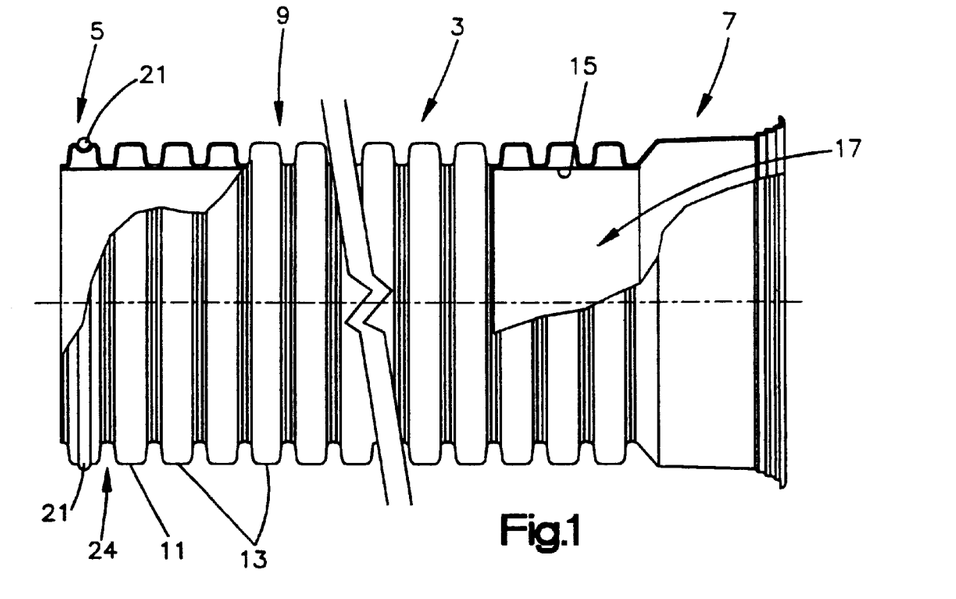
FIG. 1 is a partly cut away elevational view of a pipe section of the invention.

Now, with reference to the figures of drawing, as best seen in FIG. 1, a pipe section, generally indicated at 3, extends longitudinally between a male end or spigot, generally indicated at 5, and a female end or bell, generally indicated at 7.

Intermediate these two ends is a middle length of the pipe section generally indicated at 9, which is shown in contracted cut-away in FIG. 1. The usual length of the pipe sections of this type is about 20 feet, although there may be variations in this depending on the application and environment for which the use is desired. Inner diameters of the pipes may vary widely, but in the preferred embodiment range from about 10 inches to about 37 inches.

The pipe section 3 has an outer structure 11 which is preferably formed of a continuous extrusion of polymer material, most preferably a thermoplastic such as high density polyethylene (HDPE). The outer structure 11 has a number of ring-shaped corrugations 13 each extending around the pipe. Alternatively, the outer structure may have a different pattern, such as spiral corrugations.

The inside of the pipe section 3 is a tubular or cylindrical conduit 15 which extends between the male and female ends 5 and 7 and which is bonded to the corrugated structure 11 during fabrication of the pipe section. The conduit is preferably also formed as a continuous extrusion of polymer material, most preferably HDPE. This inner cylindrical conduit 15 defines a passage generally indicated 17 going through the pipe section from the male end 5 to the female end 7.

Figure 2:
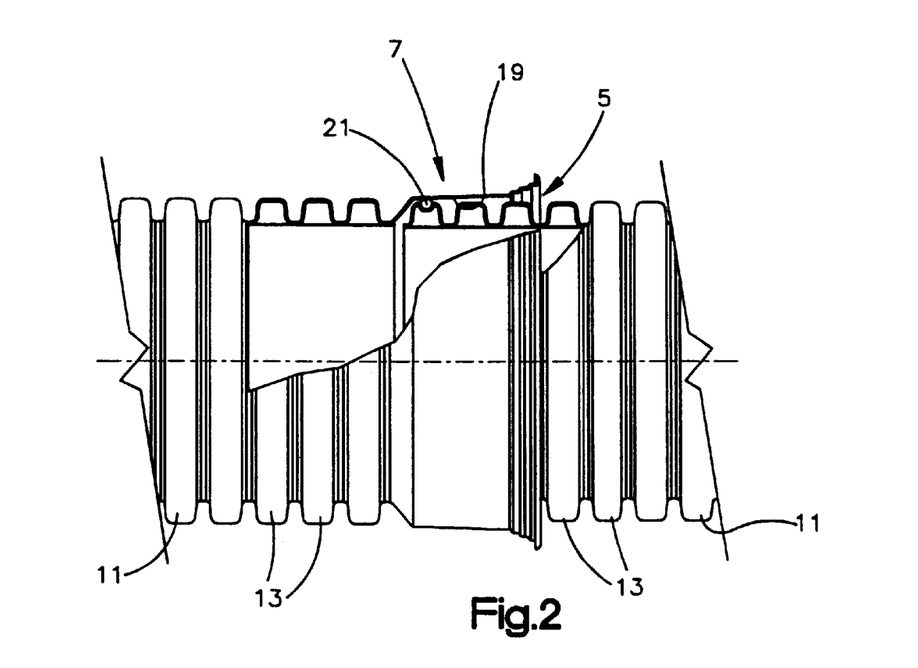
FIG. 2 is a partially cut away elevational view of the connection between the male and female connection portions of two adjacent pipe sections according to the invention.

During assembly of the pipe sections, as best shown in FIG. 2, the male end 5 is inserted into the female connection 7. The female connection provides a inwardly facing conical engagement surface 19 against which abuts a resilient sealing member 21, which is a gasket, preferably an extruded rubber profile, supported in a radially outwardly facing recess on the last corrugation 23 of the male end 5 of the pipe section 3. Alternatively, a gasket may be held in the valley 24 between the first and second corrugations at the male end 5, which gasket is radially wide enough to sealingly engage surface 19. This engagement between the sealing member 21 and the engagement surface 19 effectively seals the joint so that fluids passing through the pipe sections do not leak out in appreciable amounts. The engagement surface 19 flares outwardly at an angle of 1° to 10°, and most preferably about 5°, to the centerline axis of cylindrical conduit 15.

Figure 3:
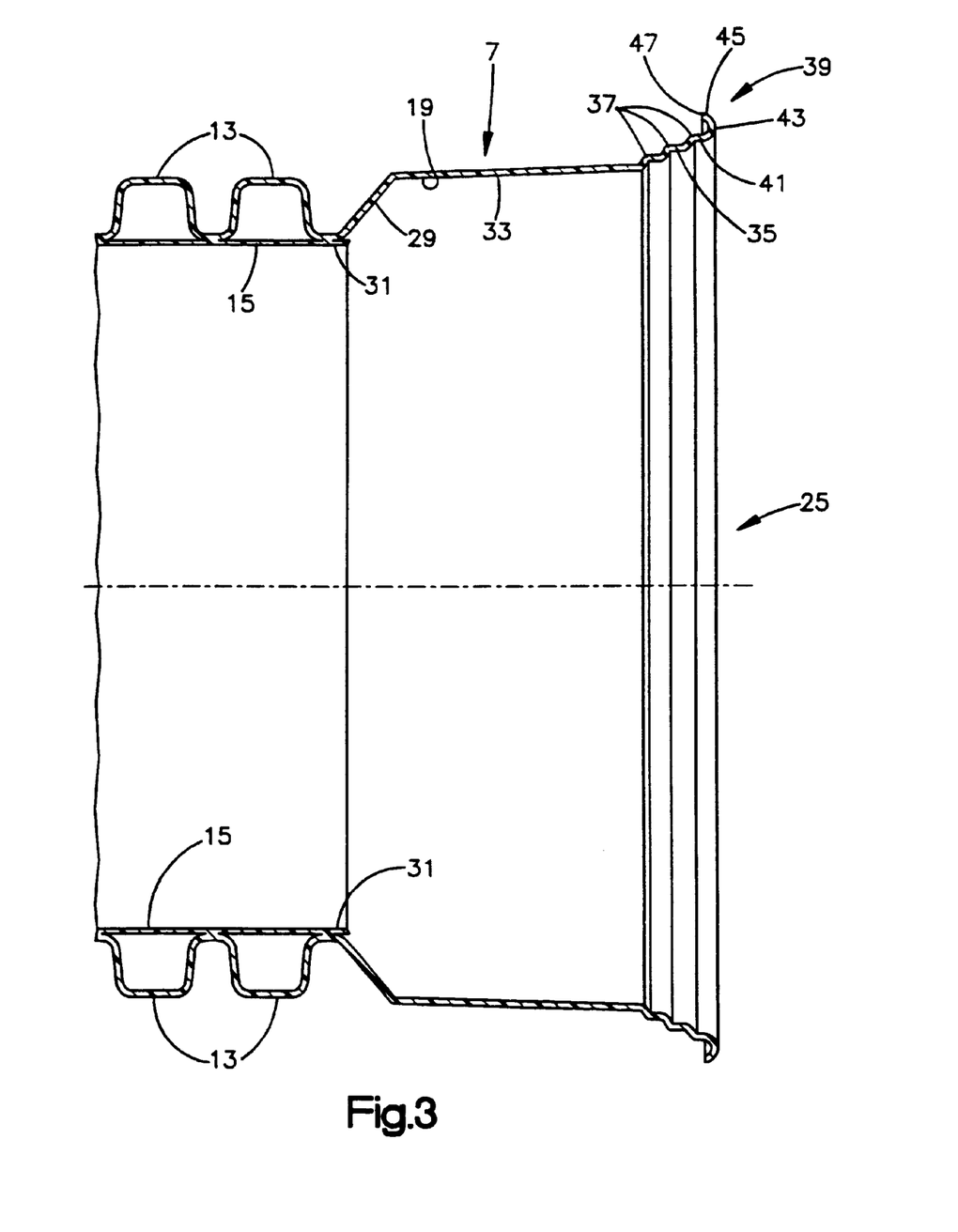
FIG. 3 is a cross sectional view taken through the centerline of the female connection portion of a pipe section according to the invention.

FIG. 3 shows an enlarged cross-section of the female connection 7. It will be understood that the cross section of the pipe section will be the same for all cross-sections through the centerline of the pipe because the form of the preferred embodiment is a shape of rotation with circular cross-sections. It will be understood that non-circular cross-section pipes, e.g., oval cross-sections, may also benefit from the present invention.

After the last corrugation 13, the female connection end 7 comprises a bell structure 27 with an opening generally indicated at 25, into which the male end 5 can be inserted. The bell structure 27 comprises a generally conical flare portion 29 which tapers longitudinally outward and radially outward from the end 31 of the cylindrical conduit 15. This taper extends to the wall portion 33 which provides the inwardly facing engagement surface 19 against which the sealing member 21 of the male end 5 engages. Wall portion 33 tapers outward at an angle of about 1° to 10°, and most preferably about 5°, as indicated above.

Longitudinally outward of engagement surface 19, the wall portion 33 includes a further flared second flare section 35. This flare section 35 flares outward at a flare of about 15° to 30°, and most preferably about 20° from the centerline of the conduit 15 and preferably has a longitudinal length of about 1 to 2 inches, and most preferably 1.5 inches.

To rigidify the end opening 25 of female connection 7, the flare portion 35 is also provided with a plurality of small corrugations or crimps 37 which provide a ribbed annular portion which extends around the circumference of the conical flare section 35. In the preferred embodiment there are three crimps 37, but it will be understood that depending on the thickness of wall used and the length of this flare section 35, more or fewer crimps may be used.

Flare portion 35 is flared out at an angle of about 20°, which allows for insertion of the male end 5 into the female connection 7 with some degree of angular play. In common installation of such pipe sections, a trench is dug and the pipe section of 20 feet in length is lowered by the use of machinery such as a back hoe. As the pipe is lowered into the trench it may be fairly difficult to ensure that the axis of the second pipe section aligns with the axis of the first pipe section perfectly. The angulation of flare portion 35 allows for some play or tolerance in the alignment, in certain good embodiments up to as much as 20 or even 30° as the male end 5 is settled into the female connection 7.

The wall portion 33 extends to a longitudinal terminal end indicated at 39. This longitudinal terminal end 39 is provided with a reinforcing rim structure which keeps the shape of the mouth 25 of the female connection 7 circular.

Figure 4:
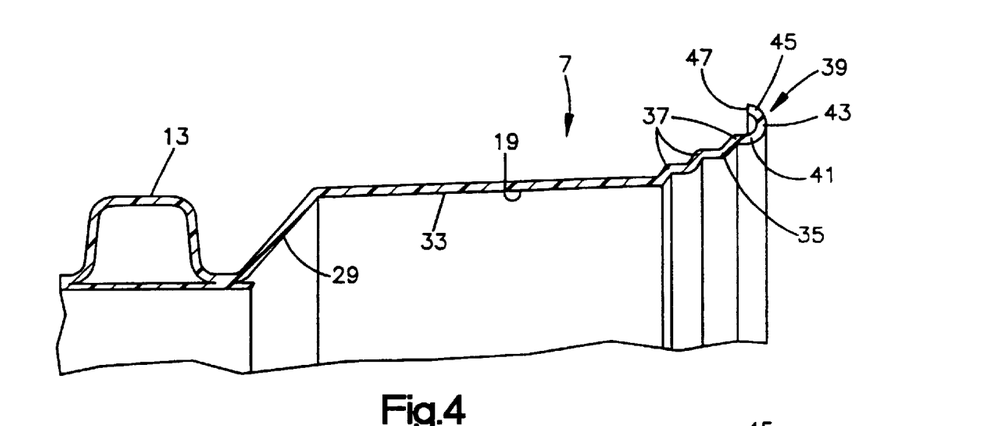
FIG. 4 shows an enlarged partial view of FIG. 3.

As best seen in FIG. 4, the reinforcing structure comprises a first portion 41 formed integral with the distal end of the second flare portion 35. This first portion 41 extends longitudinally outward of the pipe section 3. Formed integral with the first section is a second section 43 which curves to extend radially outward from first portion 41. The third portion 45 is formed integral with second portion 43 and this extends backwards in a longitudinal direction towards the longitudinal center of the pipe section 3, spaced from the first portion 41. Third portion 45 has a terminal end portion 47 which is spaced from the first portion 41.

These annular structures combine to form an annular reinforcing structure which is roughly a U-shaped channel.

The U-shaped channel has a curved cross-section taken through the centerline of the pipe section. The radius of curvature of this channel is preferably about 1.25 times the thickness of the material of the flare portion, although the radius may be as large as 4 times the thickness of the material.

When the bell 7 is formed by extrusion it has a substantially uniform thickness throughout. The preferred thickness varies with the size of the pipe. A 12-inch diameter pipe will preferably have a thickness of about 0.110 to 0.112 inches. A 30-inch inside diameter pipe will preferably have thicker material, about 0.185 inches, and a 60-inch inside diameter pipe will preferably be of material about 0.25 inches thick.

The combination of the reinforcing structure and the 20° flare is remarkably sturdy, structure, as much as about five times stronger than the same pipe without the flare or reinforcement. A deformation test comparing two 12" pipes, one with a flare and reinforced rim as described herein, and the other identical, but with no rim or flare, yielded striking results. A 5% deformation of the unflared and unreinforced pipe required a compressive lateral load of 26 pounds. To achieve the same 5% deformation in the reinforced and flared pipe required a load of 122.5 pounds.

The curving structure of this reinforcing ring formed by the portions 41, 43 and 45 also provides an additional benefit in that no corners project either in a longitudinal direction or radially. During assembly of the female connection 7 with the male end 5, the roundness of all corners prevents the end portion 39 from catching the resilient sealing member 21 and dislodging it from its position on the first corrugation 23 in the male portion 5 and also significantly reduces the insertion force.

FIGS. 5 through 10 show alternate embodiments that can also be used to reinforce the end of the female connection 7. The same reference numbers are used for similar parts in these embodiments.

Figure 5:
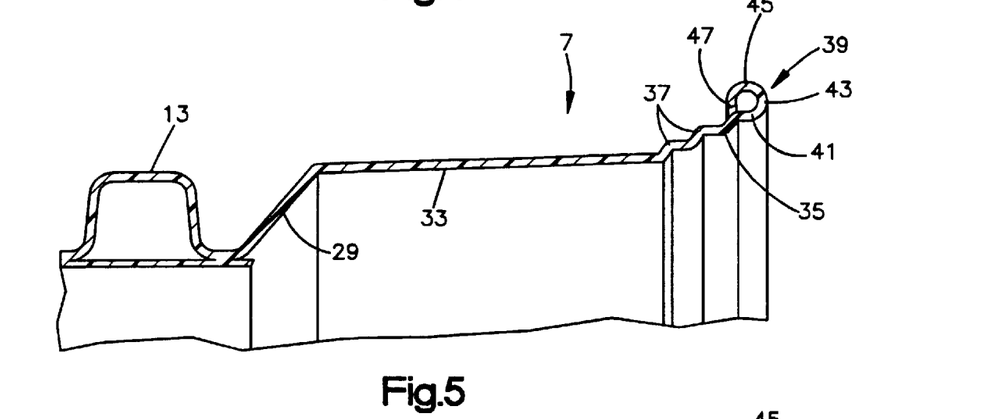
FIGS. 5 to 10 are enlarged views similar to that of FIG. 4, showing alternate embodiments of the invention herein.

FIG. 5 shows an alternate embodiment in which the third annular portion 45 is curved so that the terminal end 47 thereof contacts the outer side of flare portion 35. The result is that the reinforcing structure defined by the three elements of portions 41, 43 and 45 is a tubular structure reinforcing the rim of female connection portion 7.

Figure 6:
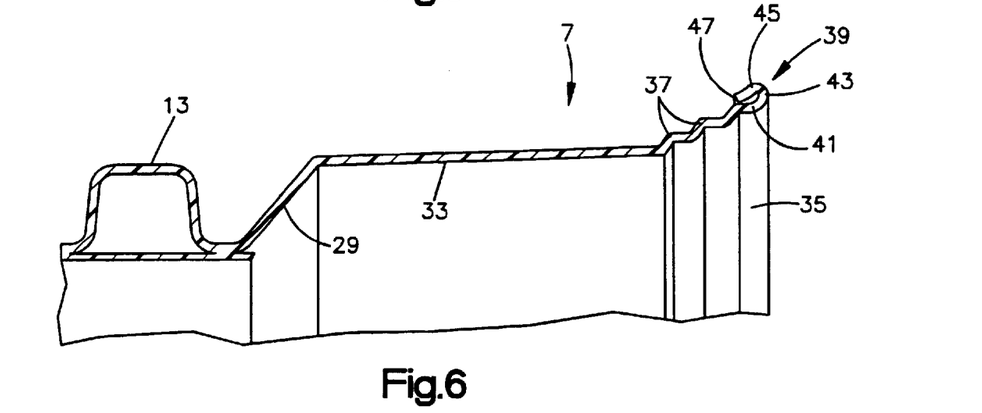

In FIG. 6, a further alternate embodiment is shown wherein the third portion 45 is pressed inward so that the third portion 45 lies adjacent to and engaging the first portion 41 on its radial outside surface.

Figure 7:
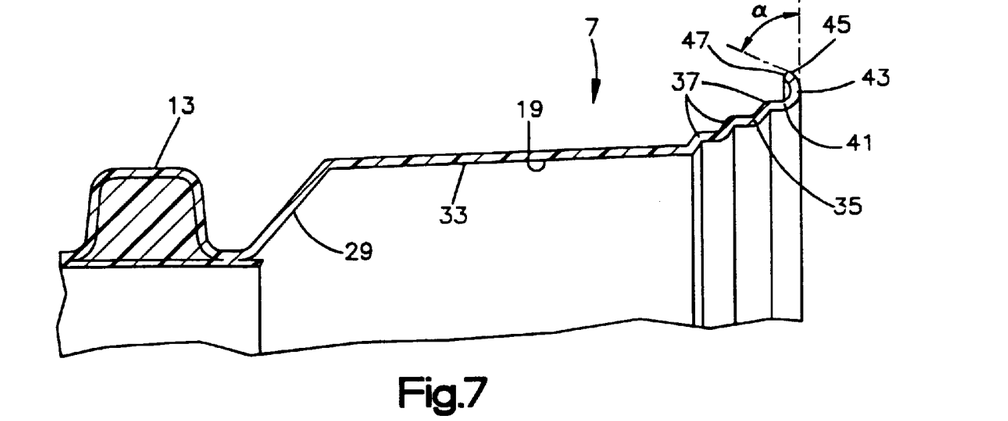

Referring to FIG. 7, a further alternate embodiment is shown wherein the curvature of the reinforcing structure at the end of the female connection 7 does not have a curvature as pronounced as that in the embodiment in FIG. 5. Instead of having the curvature of approximately a complete semicircle, the embodiment of FIG. 7 has a cross-section which is less than a semicircle and wherein the tangent to the terminal end portion 47 of the third portion 45 is at an angle a from the perpendicular passing through the longitudinal axis of the pipe section. This angle a is preferably less than 90° and more than about 10°, to produce some sort of channel structure in the rim. In the embodiment shown, the angle α is about 60°.

Figure 8:
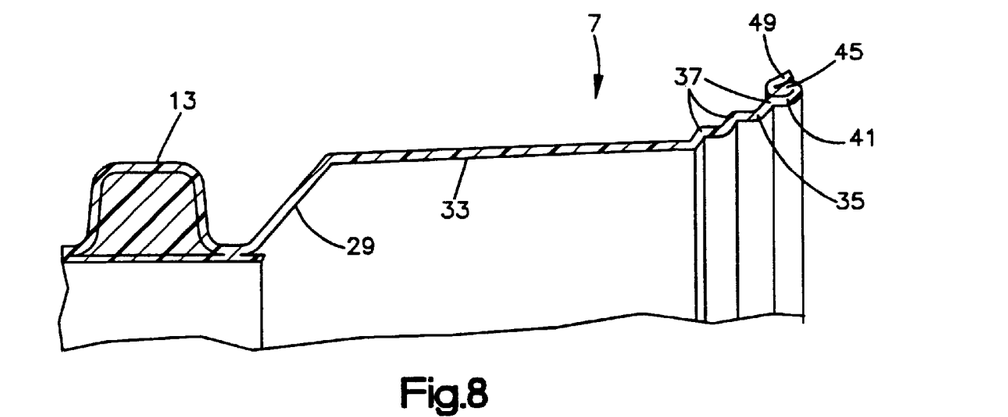

Referring to FIG. 8, an embodiment is shown wherein the third portion 45 of the reinforcing structure is connected to a further outwardly disposed portion 49 which engages and overlies the radially outer surface of third portion 45 so as to provide a generally S-shaped reinforcing structure at the mouth of female connection 7.

Figure 9:
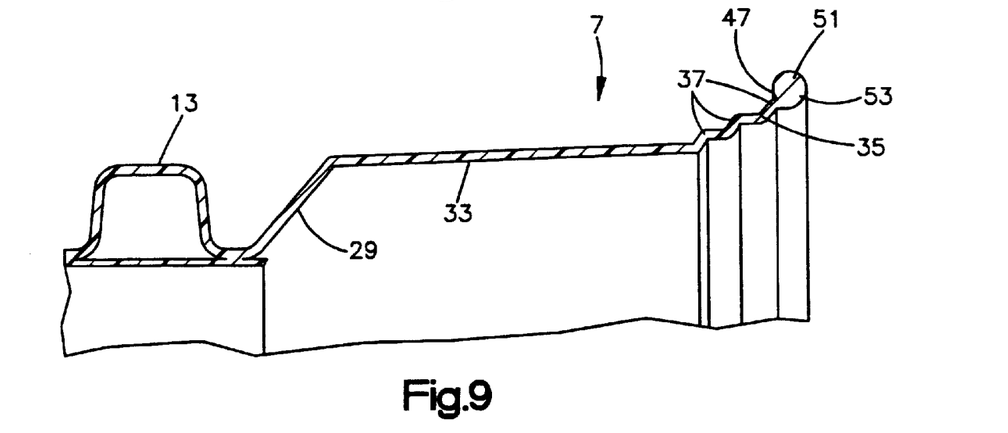

A further alternate embodiment is disclosed in FIG. 9, wherein an annular bead 51 is formed around the outside of terminal end 53. This bead 51 is annular and reinforces outer rim 53 against deformation out of a desired shape in a fashion similar to the reinforcing structures of FIGS. 4 through 8.

This bead 51 may be formed by reforming the end of the extruded bell of female connection 7 without any additional material. An alternate possibility is that the bead 51, which is of the same material as used for the extrusion, which is preferentially high density polyethylene, is additional material applied around the longitudinal terminal end 53 of the formed flare portion 35. The application of this bead 51 is under conditions sufficient to cause it to fuse with the material of the flare portion 35 and structurally unite with that member. This bead may be applied as a string of polyethylene or other suitable material wrapped around the flare portion 35, or as a loop of polyethylene material which is shrunk around the flare portion 35.

It will be understood that reinforcement structures such as the bead need not be at the terminal end of the female connection, but may provide beneficial structural reinforcement when spaced slightly inward from the end, so long as the reinforcement is in the end region of the pipe to prevent deformation of the end.

It will also be understood that these embodiments are exemplary of reinforcement structures, and that other cross-sectional structures may be readily devised by those of skill in the art.

Figure 10:
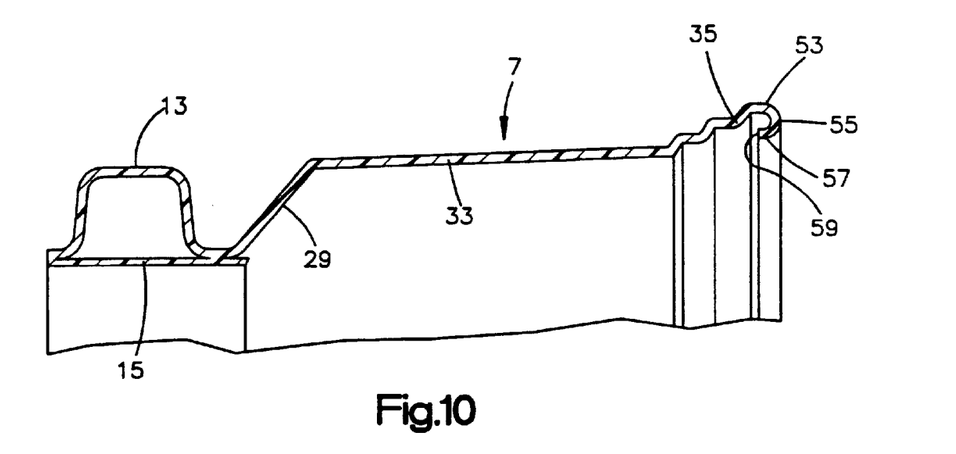

FIG. 10 shows another alternative embodiment which can be applied not only to the rim structure indicated in FIG. 4 but to the reinforcing rim structures of FIGS. 5 through 9, as well. As seen in FIG. 10, the curvature of the reinforcing structure may be reversed so that it extends radially inwardly of the flared portion 35. In FIG. 10, the reinforcing structure consists of a first portion 53 extending longitudinally outwardly, a second portion 55 extending radially inwardly and a third portion 57 which extends back longitudinally towards the longitudinal center of the pipe section 3. The inward terminal end 59 of this inward reinforcement structure is spaced inwardly from the first portion 53.

The configuration of this reinforcing structure may be varied so it can have a cross-section similar to that of the embodiment of FIG. 6 (a tube structure), FIG. 7 (a folded structure), FIG. 8 (a less than semicircular arch), or FIG. 9 (an S-shaped, folded structure). It will also be understood that the same concept can be applied to the structure of FIG. 10, wherein the bead 51 would be mounted on the radial inside of the lip 53 of the mouth of the female connection.

The preferred method of manufacture of the pipe sections of the invention is by extrusion of polymer material. Particularly preferred is the corrugated pipe extrusion method discussed in U.S. Pat. No. 5,296,188, and/or embodied in the Corma, Inc., system sold under the model designation "3020".

Such a system produces a generally continuous corrugated tube which is cut into separate pipe sections.

Figure 11:
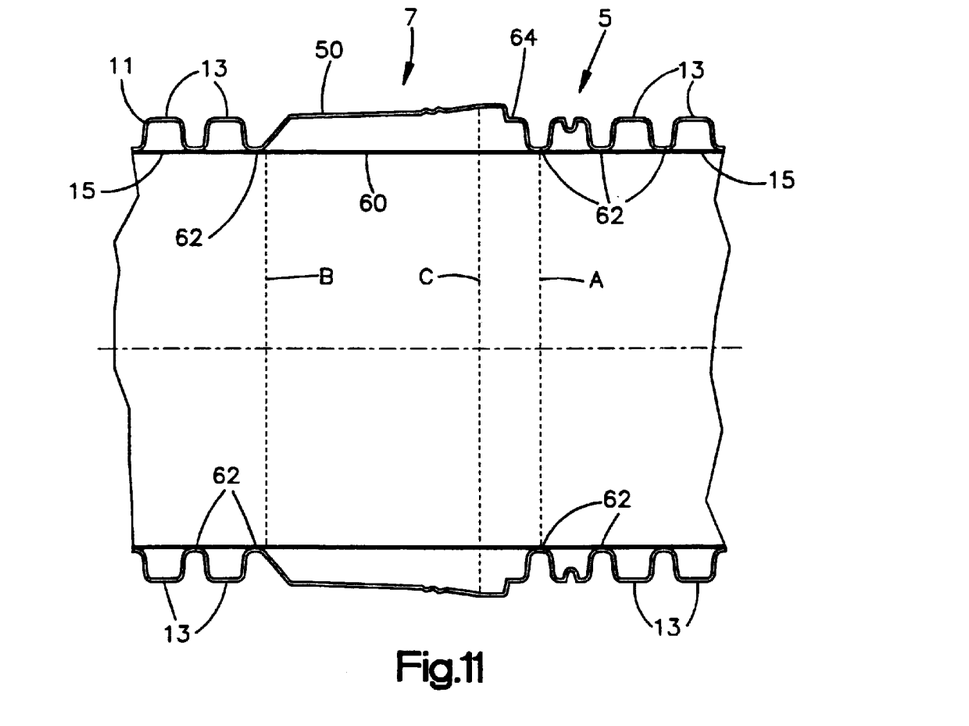
FIG. 11 is a cross-sectional view of a pipe section of the invention during manufacture.

FIG. 11 shows a segment of the continuous tube which is cut to form the male and female ends 5 and 7. The corrugated tube comprises two tubular parisons or sheets of extruded material, preferably of a thermoplastic nature, such as HDPE, which parisons have a substantially constant thickness over the length of the pipe. The outer parison 50 comprises the bell 7, including crimps 37, and the pipe structure 11 with the corrugations 13. The inner parison 60 is a generally cylindrical tube which constitutes the conduits 15 of the pipe sections 3. Both parisons are of the same material and are bonded together at annular regions 62 during the extrusion process.

The first step of processing after extrusion is that the pipe sections are cut to separate them from each other. This is done by cutting completely through the extrusion at plane A of FIG. 11.

The next step of processing involves cutting through each of the parisons 50 and 60 with a skiving tool, which is usually a router held in place to cut through one of the extruded parisons while the pipe section is rotated. Two cuts are made, inner parison 60 being skived at plane B and outer parison 50 at plane C. This frees a portion, referred to as "top-hat" 64, which is recycled.

Figure 12:
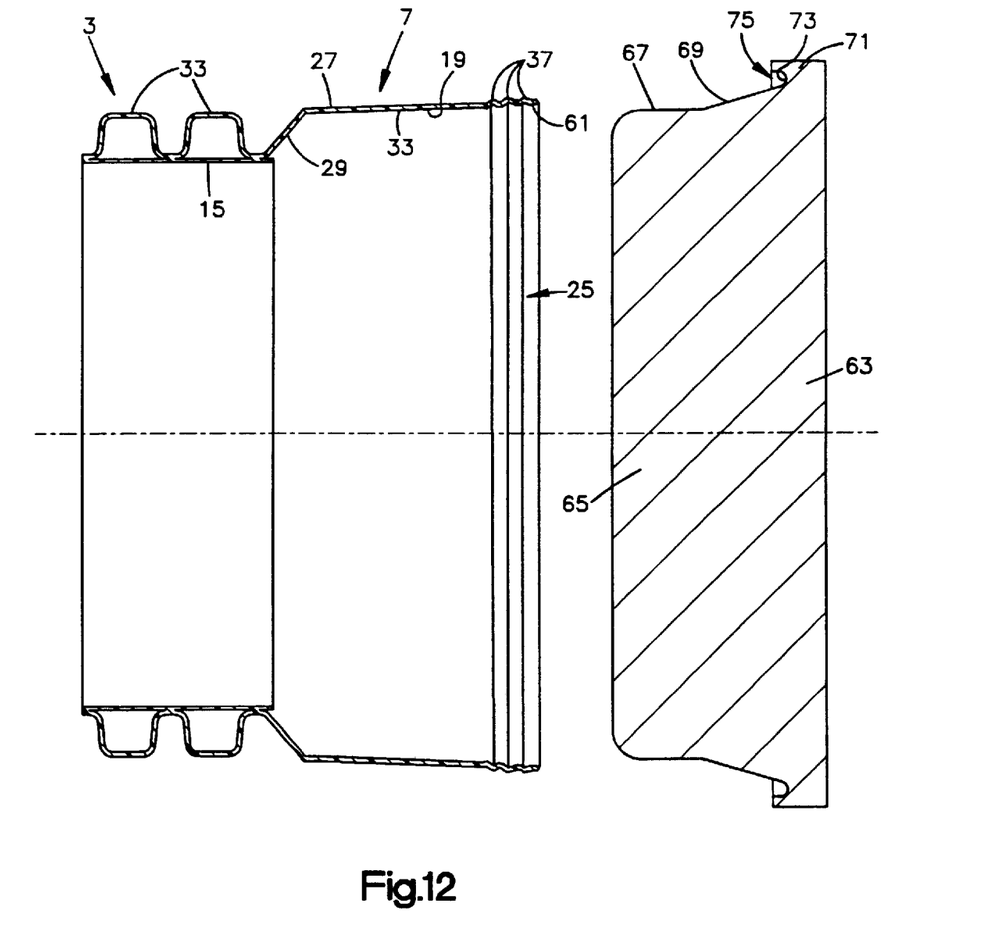
FIG. 12 shows the initial fabricated female connection portion and a mandrel used to form it into the final desired structure of the invention.

The resulting female end 7 has a cross-section as shown in FIG. 12.

As an alternative to this arrangement which requires skiving out the "top-hat" is that in the area of the bell the inner parison 60 may be pressed outward to form a double-walled bell shape. Such a structure would only require a single cut, to separate the pipe sections. The interior shape would be correct without further skiving needed.

At this point, the pipe wall portion 33 has a longitudinal end 61 which extends generally along the line of the generally conical surface 19 of wall 33. It is this end 61 that is formed into the rim structure.

In order to introduce the rim structure, the female connection 7 and a mandrel 63 are pressed together so the mandrel enters into the opening 25 of the female connection 7.

As best seen in FIG. 12, the mandrel 63 comprises a central body portion 65 which is generally circular about the central axis of the pipe section 3. This may be solid, or it may be toroidal, with a hole in the middle and a similar radially outward configuration. The central portion 65 fits into the opening 25 at the end of the pipe section, and this first portion of the mandrel has a generally cylindrical outer wall 67. The cylindrical outer wall 67 blends into a flaring frustoconical wall 69, which flares outwardly at approximately 20° to impart a flare to the end structure 61 of the female connection 7.

The frustoconical surface 69 extends flaringly outward to pocket structure 71, which includes a curving surface 73 which curves from the outer end of the frustoconical section upwardly and then back in a longitudinal direction towards the end section of the pipe structure, forming an annular pocket or trough generally indicated at 75.

In this stage of fabrication, the thermoplastic material is either heated by a secondary source or the mandrel itself may be heated to soften this material and make it pliable to form the reinforcing structure. The softened end of the pipe is then pressed into the mandrel, by movement of either the pipe or the mandrel, or both together.

The engagement of the pipe with the mandrel is at specified temperature, pressure and duration. For a 12 inch inner diameter pipe with a 0.112 inch wall thickness, the end of the pipe is heated to about 350° F., and the mandrel and pipe are pressed together with a force of about 400 pounds. The engagement is maintained for about 15 to 20 seconds, which imparts the proper shape to the pipe. These parameters, it will be understood, vary with the size of pipe, and may be varied even with the same size pipe.

Figure 13:
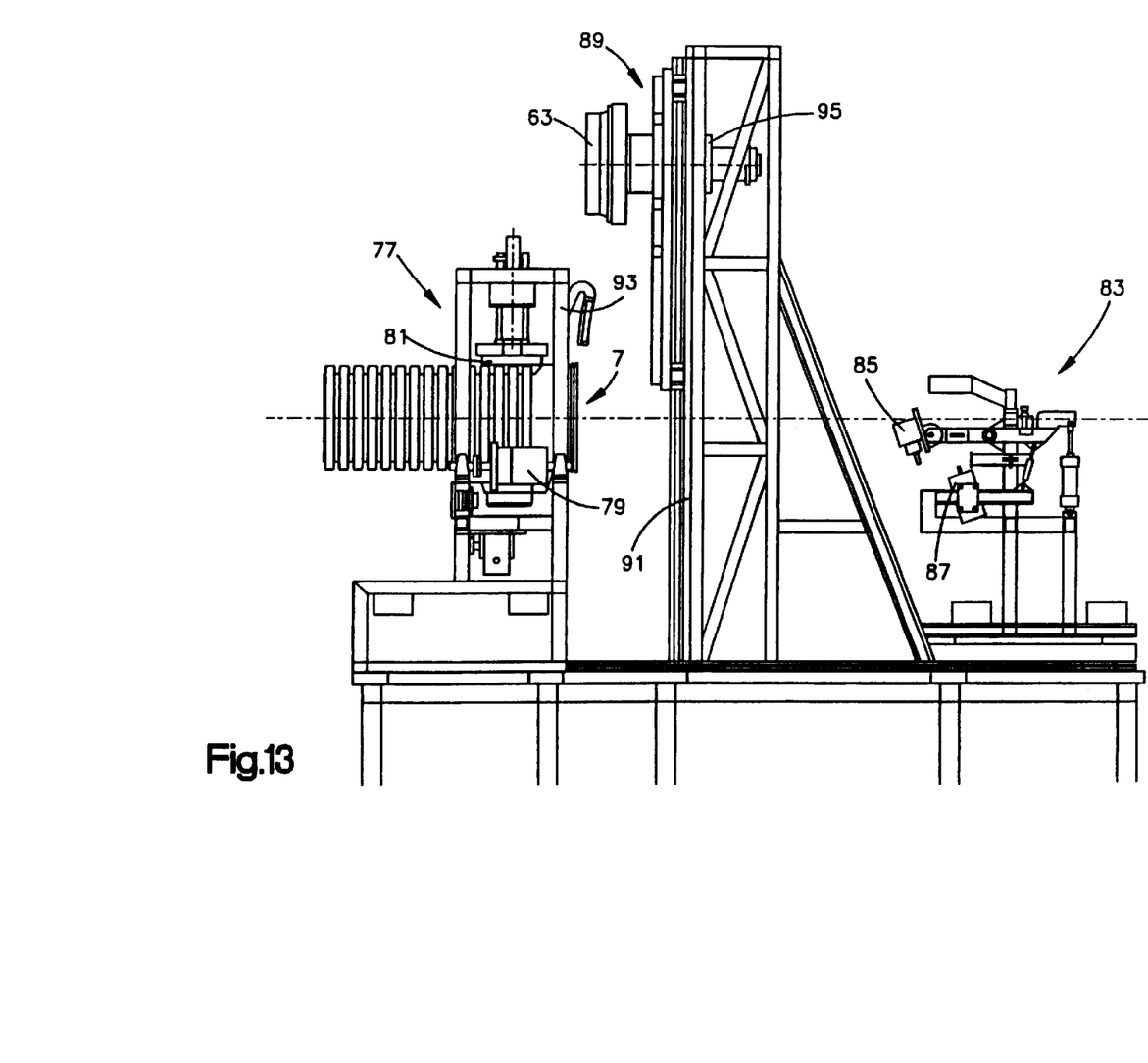
FIG. 13 shows an apparatus for forming the reinforced rim structure in a pipe section.

An apparatus particularly preferred for finishing the female end 7 of the pipe section 3 is shown in FIG. 13. The female end 7 of the pipe is held in a rotary station indicated at 77 between rollers 79 and 81 that rotate the pipe 3 in place.

First, skiving device 83, which has two routing devices 85 and 87 mounted on a moving carriage, moves laterally to place the skiving device in operative position at the end 7 of the pipe 3. As the pipe is rotated, the top-hat (not shown in FIG. 13) is cut out. The skiving device 83 is then retracted to the position shown in FIG. 13.

Mandrel device 89 then descends on vertical track 91 to line up with the end 7 of pipe 3. Heating device 93, preferably a gas torch or a quartz radiant heater, is then activated to heat and soften the material at the end of pipe 3. The mandrel 63 is supported on pneumatic cylinder structure 95, which, when activated, presses the mandrel 63 into engagement with the end 7 of the pipe 3, forming the reinforcement structure on the pipe.

The mandrel 63 is then retracted and the mandrel device 89 moves up to its starting position shown in FIG. 13.

The pipe is then cooled and allowed to set. Cooling may be assisted with an air mister.

Other systems for pressing the engagement of the pipe end with the mandrel can readily be assembled by one of ordinary skill in the art. For example, a yoke that grips the end of the pipe may be attached to a pneumatic press with the mandrel thereon which, when activated, presses the mandrel against the end of the pipe.

Different mandrel designs can be used to obtain the rim structures of alternate embodiments shown in FIGS. 5 to 10.

Figure 14:
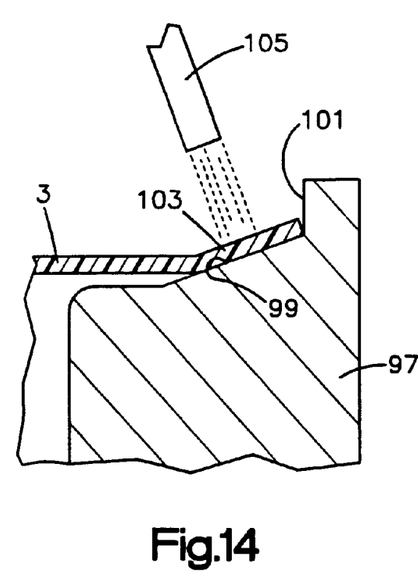
FIGS. 14–16 are detailed sectional views of mandrels for forming rim structures of alternate embodiments.

For example the embodiment of FIG. 8 is preferably obtained by the mandrel arrangement as seen in FIG. 14. Mandrel 97 has a sloping conical surface 99 which terminates at an abutment surface 101. A spot heating element 105 applies heat to a middle third of the annular end portion 103 while the mandrel 97 and pipe 3 are being rotated relative thereto. As the end portion 103 is pushed against the abutment surface 101, the softened middle portion folds to form the S-shaped reinforcement.

Figure 15:
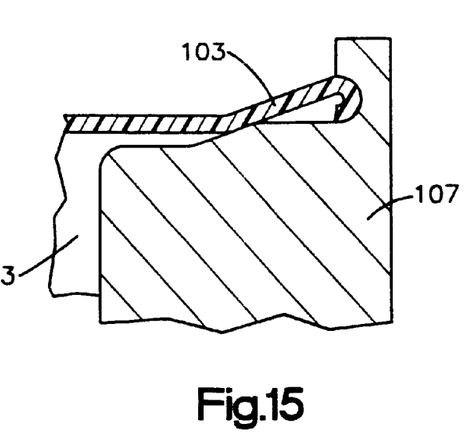

The radially inwardly disposed reinforcement structure shown in FIG. 10 is preferably formed by a mandrel 107 as seen in FIG. 15.

Figure 16:
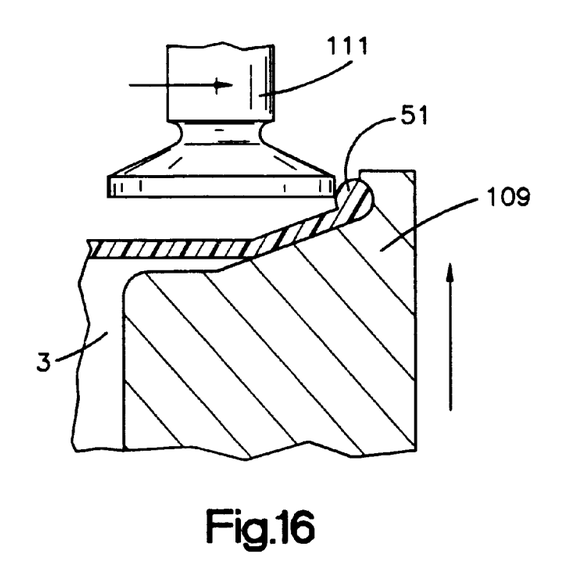

FIG. 16 shows a preferred embodiment for formation of a bead 51 as seen in FIG. 9. The mandrel 109 is rotated adjacent a rotating roller 111, which co-acts therewith to shape the bead 51 at the end of pipe 3.

The terms used herein are intended to be terms of description rather than limitation, as those knowledgeable in the art with this specification in hand will be able to make modifications therein without departing from the spirit of the invention.

What is claimed is:

1. An apparatus for forming a reinforcing structure on an end of a pipe section comprising:

a single, unitary annular mandrel having a surface for insertion into the interior of a pipe section, the mandrel including a first portion, a second portion, and a third portion, with the second portion being fixed between the first and third portions, wherein the first portion is cylindrical, the second portion is outwardly flared relative to the first portion, and the third portion includes at least a reinforcement forming portion for forming an annular reinforcing structure on the end of the pipe section;

a holder for holding the pipe section in a position to be contacted by the mandrel; and a moving mechanism for moving at least one of the pipe section and the mandrel relative to one another such that the mandrel and pipe section come together with the mandrel's first portion being first received inside the end of the pipe section followed by the second and third portions of the mandrel, wherein the mechanism is configured to move at least one of the pipe section and the mandrel such that the end of the pipe section interacts with the reinforcement forming portion of the third portion to form the reinforcing structure.

2. The apparatus of claim 1, wherein the mandrel first portion has a diameter that is smaller than a diameter of the pipe end.

3. The apparatus of claim 1, wherein the mandrel second portion has a diameter that is dimensioned to contact the pipe section at the end thereof and to flare the end of the pipe section outwardly along the length of the pipe end.

4. The apparatus of claim 3, wherein the second portion of the mandrel is flared at an angle of about 20° relative to a longitudinal axis of the mandrel.

5. The apparatus of claim 1, wherein the mandrel third portion reinforcement forming portion includes a pocket and the moving mechanism is configured to move at least one of the pipe section and the mandrel such that the end of the pipe section contacts the pocket to form a loop-shaped reinforcing structure at the end of the pipe section.

6. The apparatus of claim 5, wherein the pocket includes a curved surface.

7. The apparatus of claim 5, wherein the mandrel third portion further includes a cylindrical portion positioned between the second portion and the reinforcement forming portion, said third portion cylindrical portion having a diameter greater than the diameter of the cylindrical first portion, with the pocket being configured to contact an exterior surface of the end of the pipe section to form the loop-shaped reinforcing structure.

8. The apparatus of claim 5, further comprising a roller unit positioned adjacent the pocket in the third portion of the mandrel for contacting the end of the pipe section, wherein the moving mechanism is configured to move at least one of the pipe section and the mandrel such that an inner surface of the end of the pipe section contacts the pocket, and the roller unit is configured to contact an outer surface of the end of the pipe section in the vicinity of the pocket, said pocket and roller unit together configured to form a beaded reinforcing structure at the end of the pipe section.

9. The apparatus of claim 1, further comprising a heating device positioned adjacent the holder and oriented to direct heat toward the end of the pipe section.

10. The apparatus of claim 9, further comprising a cooling device for directing cooling flow toward the end of the pipe section.

11. The apparatus of claim 1, further comprising a heating unit coupled to the mandrel for heating the mandrel.

12. The apparatus of claim 1, wherein the holder is a rotary station that includes rollers upon which the pipe section is positioned, said rollers for allowing rotation of the pipe end relative to the mandrel.

13. The apparatus of claim 1, wherein the mandrel is positioned on a mandrel device having a vertical track and a pneumatic cylinder structure, and the moving mechanism includes the vertical track for moving the mandrel vertically and the pneumatic cylinder structure for moving the mandrel horizontally relative to a longitudinal axis of the pipe section in the holder.

14. The apparatus of claim 9, wherein the pneumatic cylinder structure is further configured to rotate the mandrel.

15. The apparatus of claim 1, wherein the mandrel third portion reinforcement forming portion is an annular wall and the moving mechanism is configured to move at least one of the pipe section and the mandrel such that the end of the pipe section contacts the wall.

16. The apparatus of claim 1, further comprising a skiving mechanism for cutting the pipe section prior to operation of the mandrel on the pipe section, said skiving mechanism being movable relative to the holder.

17. The apparatus of claim 1, wherein the mandrel comprises a solid mass of material.

18. An apparatus for forming a reinforcing structure on an end of a pipe section comprising:

a single, unitary annular mandrel having a surface for insertion into the interior of a pipe section, the mandrel including a first portion and a third portion, with the first portion being fixedly coupled to the third portion, wherein the first portion is cylindrical and the third portion includes a reinforcement forming portion for forming a reinforcing structure on an end of the pipe section;

a holder for holding the pipe section in a position to be contacted by the mandrel; and a moving mechanism for moving at least one of the pipe section and the mandrel relative to one another such that the mandrel and pipe section come together with the mandrel's first portion being first received inside the end of the pipe section, wherein the moving mechanism is configured to move at least one of the pipe section and the mandrel such that the end of the pipe section interacts with the reinforcement forming portion of the third portion to form the reinforcing structure.

19. The apparatus of claim 18, wherein the mandrel further comprises a second portion fixedly positioned between the first and the third portion, said second portion having a flared frustoconical surface for contacting the pipe section.

* * * * *